Dec. 8, 1964   E. A. DE ZUBAY ETAL   3,159,999
METHOD FOR DETERMINING SETTLING IN DISPERSIONS
Filed July 18, 1961   2 Sheets-Sheet 2

INVENTORS
Egon A. DeZubay &
Emil S. Schmitt, Jr.

BY Martha L. Ross
AGENT 3,159,999
METHOD FOR DETERMINING SETTLING IN DISPERSIONS
Egon A. De Zubay, Falls Church, Va., and Emil S. Schmitt, Jr., Washington, D.C., assignors to Atlantic Research Corporation, Fairfax County, Va., a corporation of Virginia
Filed July 18, 1961, Ser. No. 124,885
5 Claims. (Cl. 73—53)

This invention relates to a device and method for determining and measuring sedimentation or separation of dispersions.

In the preparation of dispersions such as suspensions or emulsions, it may be essential that they remain indefinitely stable, or if sedimentation or separation does occur during storage, that the extent of such settling be readily determinable.

Oftentimes, a dispersion is not intended to be used immediately but is stored for a period of time. If settling occurs during storage, this will cause a variation in the density of this dispersion which may render it unfit for its intended use. Thus, it is necessary when formulating these dispersions that they be tested periodically to determine whether settling occurs and to what extent. The evidence gleaned from such determinations provides the necessary information regarding the suitability of the dispersions.

When the dispersion has been stored, it is often desirable that it be tested prior to use to determine if settling has occurred during storage.

Thus, it is an object of this invention to provide a method and a device for determining whether settling has occurred in a dispersion.

A further object is to provide a device and method for determining the settling rate.

Other objects of the present invention will become apparent from the following detailed description taken in conjunction with the drawings which accompany and form a part of this specification.

Figure 1:
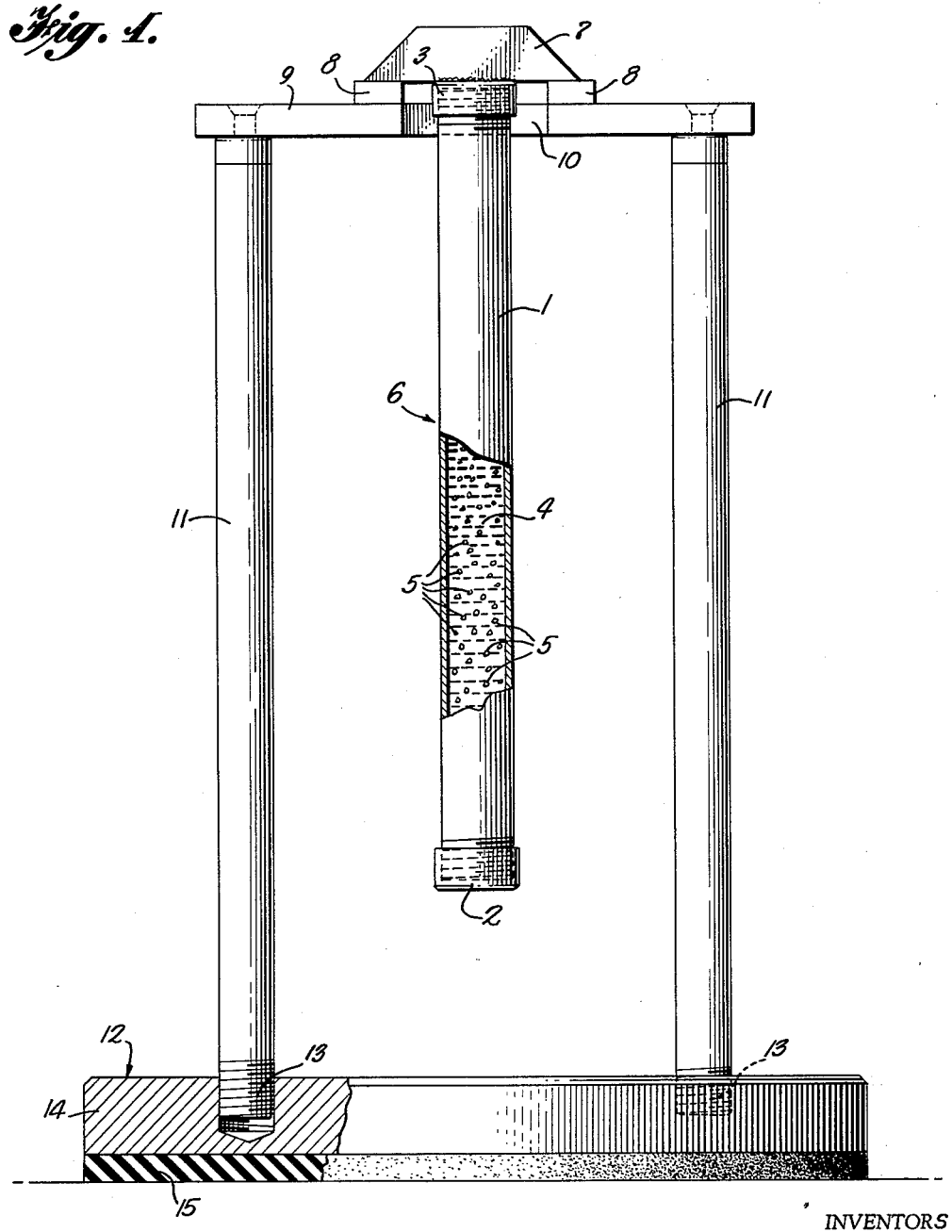
Figure 2:
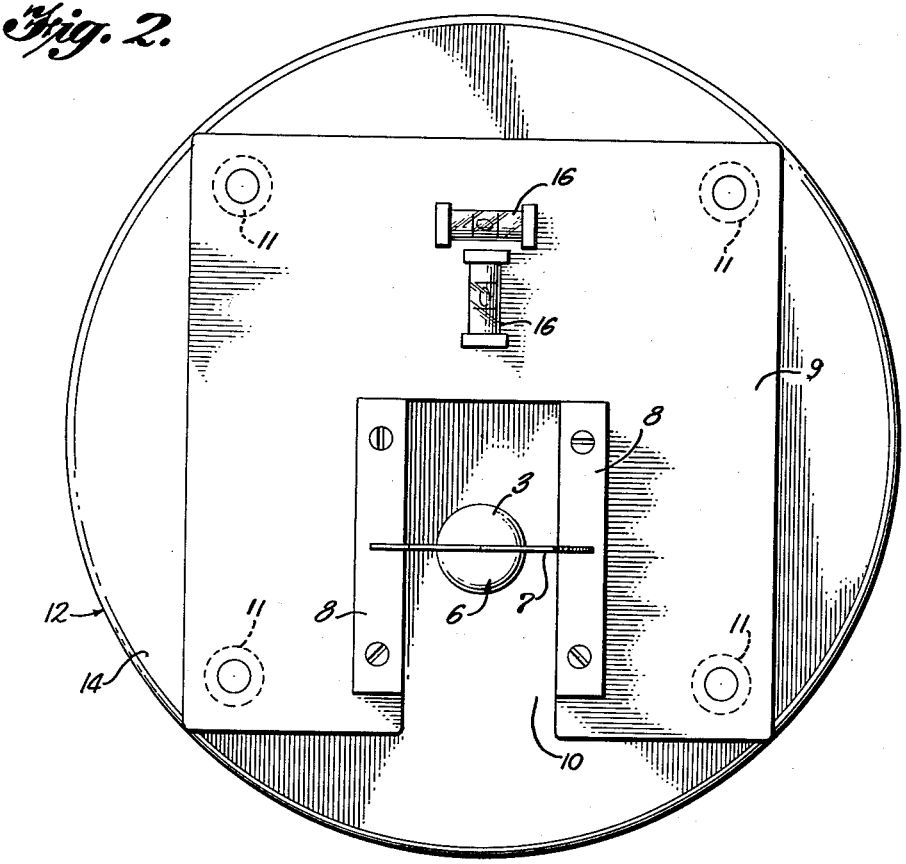
Figure 3:
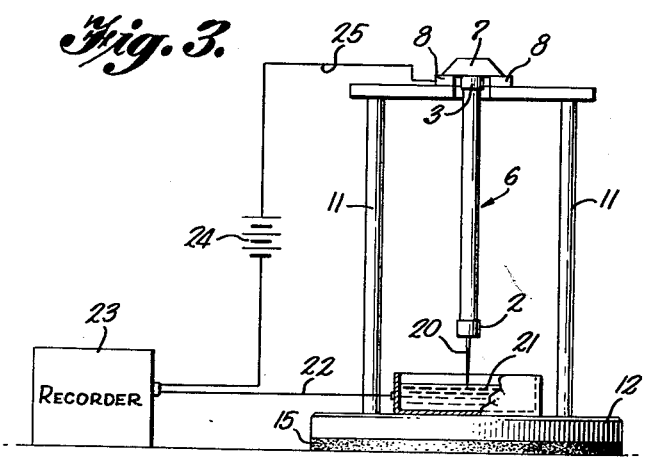

In the drawings:
FIGURE 1 is an elevation view of the apparatus used in the present invention.
FIGURE 2 is a plan view of FIGURE 1.
FIGURE 3 is a form of counting apparatus used in the invention.

Broadly speaking, the invention comprises a method for detecting settling in a dispersion by determining whether the center of gravity of a given mass of material shifts with time, and a device for determining and measuring such change.

In general, the method of the invention comprises testing the settling in a dispersion by swinging a pendulum containing the dispersion in a plane and counting the number of cycles completed within a period of time. The apparatus of the invention comprises a hollow container or cylinder, preferably rigid, which can be of any desired cross-sectional shape, e.g., circular or rectangular, such as an elongated tube. This container is filled with a dispersion such as a slurry of a solid in a liquid. The container is suspended at one end by a low friction support and performs as a compound pendulum. The frequency of oscillation of the pendulum, which is the number of cycles it makes in one second, is noted. If settling occurs after a period of time, the center of gravity of the pendulum will change and cause a change in the frequency. Thus, an indication of settling is afforded.

In FIGURE 1, there is shown a hollow cylindrical tube 1, preferably closed at one end by a cap 2 which is threaded or welded to the tube. Threadably attached to the other end of the tube 1 is another cap 3 which can be removed to allow filling of the cylinder with the dispersion being tested, such as a slurry 4 comprising solid particles 5 dispersed in a liquid matrix as shown in the cutaway section of the tube. This combination of tube 1, caps 2 and 3 and slurry 4, forms a compound pendulum broadly indicated as 6.

Attached to the cap 3 is knife-edge 7 which rests on opposed blocks 8 composed of a hard material such as glass. This combination of knife-edge 7 and glass blocks 8 is an example of a low-friction mounting available for use, the main purpose being to offer as little resistance as possible to the movement of the pendulum.

The blocks 8 are attached to an elevated support 9 which can be made of Plexiglas and which has a removed portion 10, better shown in FIGURE 2, that permits placing the pendulum 6, with knife-edge 7 attached, on the opposed blocks 8. Elevation of the support 9 is obtained by adjustable legs 11 which are threadably engaged with base 12, by threads 13, as shown in partial section in FIGURE 1. The upper ends of legs 11 have a reduced cross section and fit through apertures in the support 9. The base 12 is composed of two sections 14 and 15. The upper section 14 is made of a heavy material, such as steel, to give weight to the base. The bottom section 15 is a soft material, such as rubber, to cushion top section 14. A base 12 thus made is known as a seismic mounting which insulates the pendulum from external vibrations. Any or all of the legs 11 may be adjusted to level the elevated platform 9 with the aid of conventional spirit levels 16 which can be attached to support 9 as shown in FIGURE 2.

In operation, the cap 3 is removed and the slurry 4 is deposited in the tube 1. The cap 3 is replaced and the pendulum 6 is suspended from the blocks 8 by the knife-edge 7. After the elevated platform 9 is determined to be level, the pendulum is allowed to oscillate or swing through a small arc. The number of cycles that the pendulum makes in a given period of time is counted. The cycles can be counted visually, and the time can be measured by a stopwatch. This will determine the initial frequency. The pendulum can then be removed from the mounting and placed vertically at rest for any given length of time. The pendulum is then replaced on the blocks 8 and again allowed to oscillate. The number of cycles made in a given period of time is again recorded, and the second frequency is determined. Any difference between the initial and second frequencies in the two tests will indicate that settling has occurred. Settling, or separation of the disperse phase, such as dispersed solids, causes the center of gravity to change, and thus causes the change in the frequency of the pendulum.

Since settling has been indicated by the change in the frequency of oscillation, an indication of the nature of the settling may be desired, such as the variation in the density of the slurry. Density, being the weight of the slurry per cubic centimeter, will progressively increase from the top of the tube to the bottom after settling begins. This is because the heavier solid particles have begun to settle or sink in the liquid matrix. This density variation can be determined by mathematical analysis as follows:

The equation of motion for a pendulum is $$-(W_t d_t + W_s d_s) \sin \Theta = \Sigma I \frac{d^2\Theta}{dt^2} \quad (1)$$

Where
$W_t$ = weight of the tube
$W_s$ = weight of slurry
$d_t$ = distance to centroid of tube from the top of pendulum
$d_s$ = distance to centroid of slurry from top of pendulum $\Theta$ = angle of swing from rest to height of swing. Sin $\Theta \cong \Theta$ for small angles.
$I$ = moment of inertia about axis of suspension If $y$ is the length of the tube, the moment of inertia of the tube is $$I_t = \frac{y^2 W_t}{3} \qquad (2)$$

and the tube centroid (center of mass) is $$d_t = \frac{2}{y} \qquad (3)$$

which is one-half the length of the tube.

The moment of inertia for the slurry is $$I_s = \int_0^y x \rho \frac{\pi D^2}{4} dx \qquad (4)$$

where $x$ = distance from bottom of the pendulum
$\rho$ = density at any point, $x$.

For mathematical simplification, Formula 4 assumes that the slurry fills the tube.

If, after settling, a linear density variation is assumed, the density, $\rho$, at any point is $$\rho = \bar{\rho}\left[1 + \frac{\delta}{2}\left(1 - 2\frac{x}{y}\right)\right] \qquad (5)$$

where $\bar{\rho}$ = average or initial density of the slurry
$\delta$ = the total variation in density from top to bottom of tube.

Substituting $\rho$ into Equation 4 and solving for $I_s$ gives:

$$I_s = \frac{y^2 W_s}{3}\left(1 + \frac{\delta}{4}\right) \qquad (6)$$

The slurry centroid is found to be $$d_s = \frac{y}{2}\left(1 + \frac{\delta}{6}\right) \qquad (7)$$

If $\delta = 0$, as it would initially since there is uniform density throughout the slurry, then Equations 6 and 7 can be seen to be the same as Equations 2 and 3 except, of course, for the different weights of the tube and slurry. Equations 3 and 7 show that initially the center of both masses is one half the length of the pendulum $$\left(\frac{y}{2}\right)$$

This is the center of gravity initially.

Substituting the Equations 2, 3, 6 and 7 into Equation 1 gives the motion equation:

$$-\left[W_t \frac{y}{2} + W_s \frac{y}{2}\left(1 + \frac{\delta}{6}\right)\right]\Theta = \frac{d^2\Theta}{dt^2}\left[\frac{W_t y^2}{3} + \frac{W_s y^2}{3}\left(1 + \frac{\delta}{4}\right)\right] \qquad (8)$$

In solving this differential equation we obtain the frequency, $f$.

$$f = \frac{1}{2\pi} \sqrt{\frac{\left(\frac{W_t}{W_s} + 1 + \frac{\delta}{6}\right) 3g}{\left(\frac{W_t}{W_s} + 1 + \frac{\delta}{4}\right) 2y}} \qquad (9)$$

Initially at $f_0$, when the slurry is first put in the tube and is of uniform density throughout, $\delta$, equals zero. Thus, in terms of initial frequency, $f_0$, Equation 9 becomes:

$$f_0 = \frac{1}{2\pi}\sqrt{\frac{3g}{2y}} \qquad (10)$$

and substituting this value into Equation 9 gives $$f = f_0 \sqrt{\frac{\frac{W_t}{W_s} + 1 + \frac{\delta}{6}}{\frac{W_t}{W_s} + 1 + \frac{\delta}{6}}} \qquad (11)$$

Solving Equation 11 for $\delta$ gives $$\delta = \frac{12\left[\frac{W_t}{W_s} + 1\right]\left[1 - \left(\frac{f}{f_0}\right)^2\right]}{3\left(\frac{f}{f_0}\right)^2 - 2} \qquad (12)$$

Thus, since the weights of the tube and sample are known, and since the initial and final frequencies can be determined, as by counting, the variation in density, $\delta$, of the slurry can be calculated by substituting the appropriate values in Equation 12. If measurement of the frequencies before and after settling in a tube 30 inches long with a diameter of 1.25 inches was $f_0 = 1.100$ c.p.s.
$f = 1.090$ c.p.s.

and if the ratio, $W_t/W_s$, of the weight of the tube to the weight of the slurry was $W_t/W_s = .20$ then solving Formula 12 for $\delta$ would give $\delta = .274$ or, in terms of percentage, equals a 27.4% variation in the density over the length of the tube. In the tube 30 inches long, this would be .91% per inch.

A simple parameter for reporting settling rates would be in terms of the period, T. Since the period is the reciprocal of the frequency, the initial and final frequency could be converted to periods. Then a ratio of the difference of the final period to the initial period $(T_1 - T_0)$ divided by the interval of time between measurement would give a value to indicate the settling rate.

Obviously, other parameters could be used such as the change in the center of gravity of the pendulum, or the change in density with time. It is not intended to limit the scope of the invention by the particular mathematics employed in determining settling and settling rates.

It is preferred to employ certain features in the tube itself to aid in the detection of settling. If the tube is elongated, the settling will cause the new center of mass of the slurry to be farther removed from the original center of mass than it would be with a container having a smaller length to width ratio. Thus, the shift in center of gravity of the pendulum will be larger with a larger change in frequency. If the weight of the tube is large compared with the weight of the quantity of slurry that is inserted in the tube, the shift in the center of gravity caused by the settling of the solids will be small with a small accompanying change in frequency. Therefore, it is desirable to keep the weight of the tube at a minimum, such as by using a thin-walled tube, so that the frequency change will be more clearly detectable. The necessity for minimizing the effect of the tube is readily understood in the case of a slurry, which, after many months of storage, exhibits only minor settling. If the weight of the tube is excessively large compared with the weight of the slurry, or if the tube is not elongated, the overall center of gravity might not be appreciably shifted to cause a significant change in the frequency of the pendulum, and the setting might go undetected.

FIGURE 3 shows apparatus for counting automatically the cycles of the pendulum. Attached to the bottom of the pendulum 6 is a needle or fine wire 20. Below the needle is a pool of mercury 21 having a wire 22 connected to recording apparatus 23. This can be a Visicorder such as manufactured by the Minneapolis-Honeywell Corporation. The circuit is completed through battery 24, wire 25, one of the opposed metal blocks 8, and knife-edge 7 connected to the pendulum 6.

As the pendulum 6 oscillates, needle 20 comes into contact with the pool of mercury 21 at the bottom of each swing. Current flows in the circuit and an indication of current flow is recorded in the Visicorder 23.

Other ways to count automatically the oscillations of the pendulum are possible. A further example would be to have the pendulum during its swing interrupt a beam of light impinging upon a phototube. The output of the phototube would be a series of pulses which could then be counted by a conventional counter.

While the use of the term "slurry" has been used throughout the specification, it is only one type of dispersion for which the apparatus can be utilized. The apparatus can be used to determine the separation in a dispersion of a liquid which is suspended in another liquid, or can be used for any dispersion where there is division into at least two physical phases.

In addition, this invention has been described with reference to particular apparatus, but it will be apparent to those skilled in the art that it can be in other forms within the scope of the invention.

We claim:

1. A method for testing the settling in a dispersion, said dispersion being part of a pendulum, comprising oscillating said pendulum in one plane, counting the number of cycles of oscillation occurring within at least two intervals of time, determining the rate of oscillation of said pendulum for each time interval, and comparing the rates, whereby any occurrence of settling in said dispersion is determined by the comparison.

2. A method for testing the settling in a dispersion comprising forming the dispersion into a rigidly-contained elongated mass, initiating oscillation of said rigidly-contained elongated mass in one plane only, counting the number of cycles of oscillation occurring within at least two intervals of time, determining the rate of oscillation of said mass for each interval of time, and comparing the rates, whereby any occurrence of settling in said dispersion is determined by the comparison.

3. A method for testing the settling in a dispersion comprising forming the dispersion into a rigidly-contained elongated mass, initiating oscillation of said mass in one plane only, counting the number of cycles of oscillation occurring within an interval of time, terminating the oscillation of said mass, subsequently reinitiating oscillation of said mass in one plane only and again counting the number of cycles of oscillation occurring within an interval of time, determining the rate of oscillation of said mass for each interval of time, and comparing the rates, whereby any occurrence of settling in said dispersion is determined by the comparison.

4. A method for determining the occurrence of settling in a dispersion comprising making said dispersion part of a pendulum, counting the number of cycles of oscillation which occur when said pendulum is oscillated in one plane during two separate time intervals, determining the rate of oscillation of said pendulum for each of said time intervals, and comparing the rate determined in the first interval with the count obtained in the second interval, whereby any occurrence of settling in said dispersion is determined by the comparison.

5. A method for determining the occurrence of settling in a dispersion comprising admitting a quantity of the dispersion into an elongated tubular receptacle to form a compound pendulum, counting the number of cycles of oscillation which occur when said pendulum is oscillated in one plane during two separate time intervals, determining the rate of oscillation of said pendulum for each of said time intervals, and comparing the rate determined in the first interval with the rate determined in the second interval, whereby any occurrence of settling in said dispersion is determined by the comparison.

References Cited by the Examiner

UNITED STATES PATENTS

| 508,530 | 11/93 | Riefler | 5—133 |
| 1,787,536 | 1/31 | Hayes | 73—382 |
| 2,635,462 | 4/53 | Poole et al. | 73—32 |
| 2,889,702 | 6/59 | Brooking | 73—32 |

RICHARD C. QUEISSER, *Primary Examiner.*

ROBERT EVANS, *Examiner.*

UNITED STATES PATENT OFFICE
CERTIFICATE OF CORRECTION

Patent No. 3,159,999

December 8, 1964

Egon A. De Zubay et al.

It is hereby certified that error appears in the above numbered patent requiring correction and that the said Letters Patent should read as corrected below.

Column 3, lines 11 to 13, formula (3) should appear as shown below instead of as in the patent:

$$d_t = \frac{y}{2}$$

column 4, line 66, for "setting" read -- settling --; column 6, line 17, for "count obtained" read -- rate determined --.

Signed and sealed this 27th day of April 1965.

(SEAL)
Attest:

ERNEST W. SWIDER
Attesting Officer

EDWARD J. BRENNER
Commissioner of Patents